Nov. 28, 1950          J. M. HALL          2,531,879
GASEOUS CURRENT SPRAY DRIER
Filed April 16, 1945          2 Sheets-Sheet 1
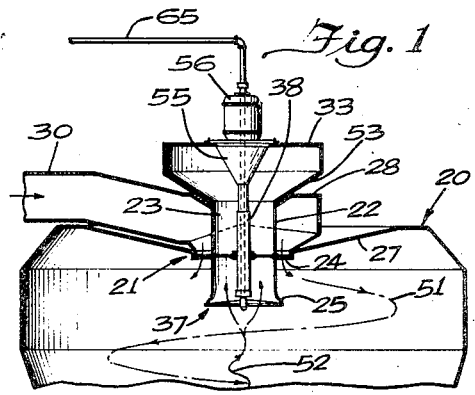
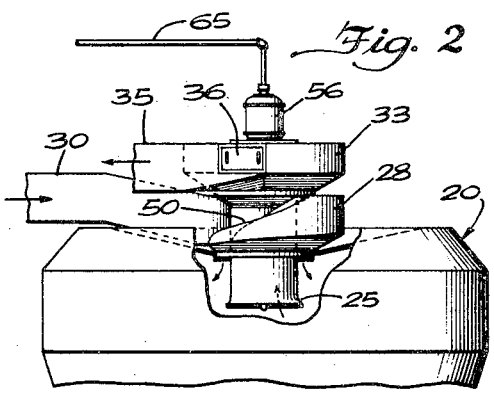
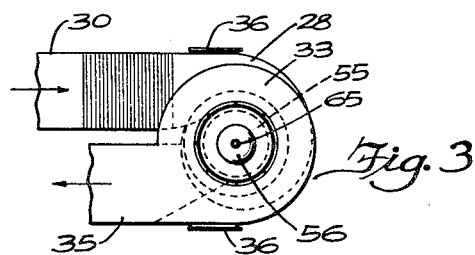
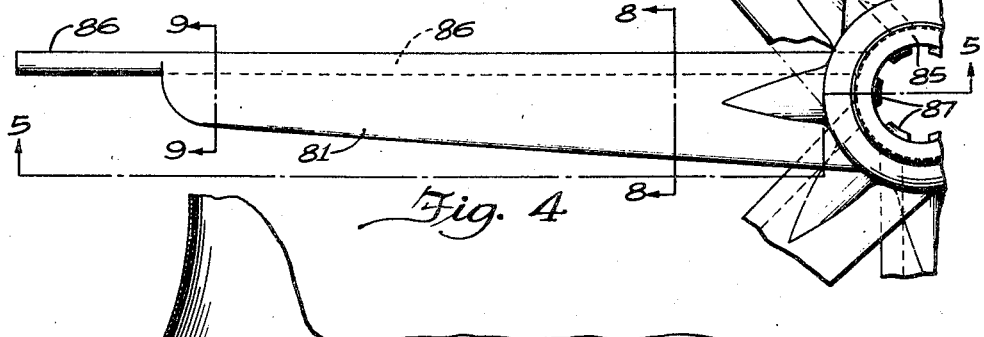
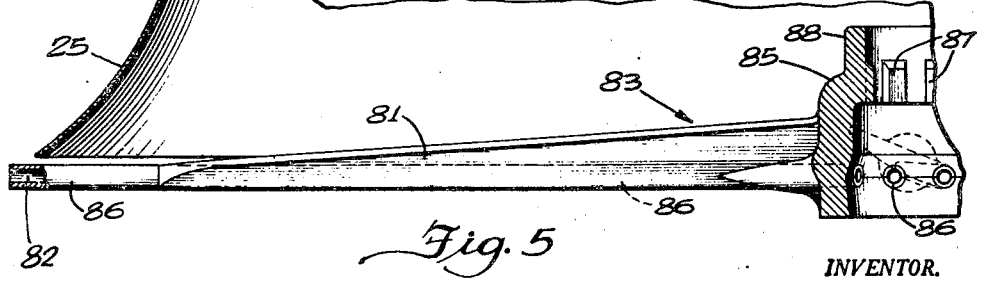
INVENTOR.
Joseph M. Hall
BY
Mann and Brown
Att'ys.

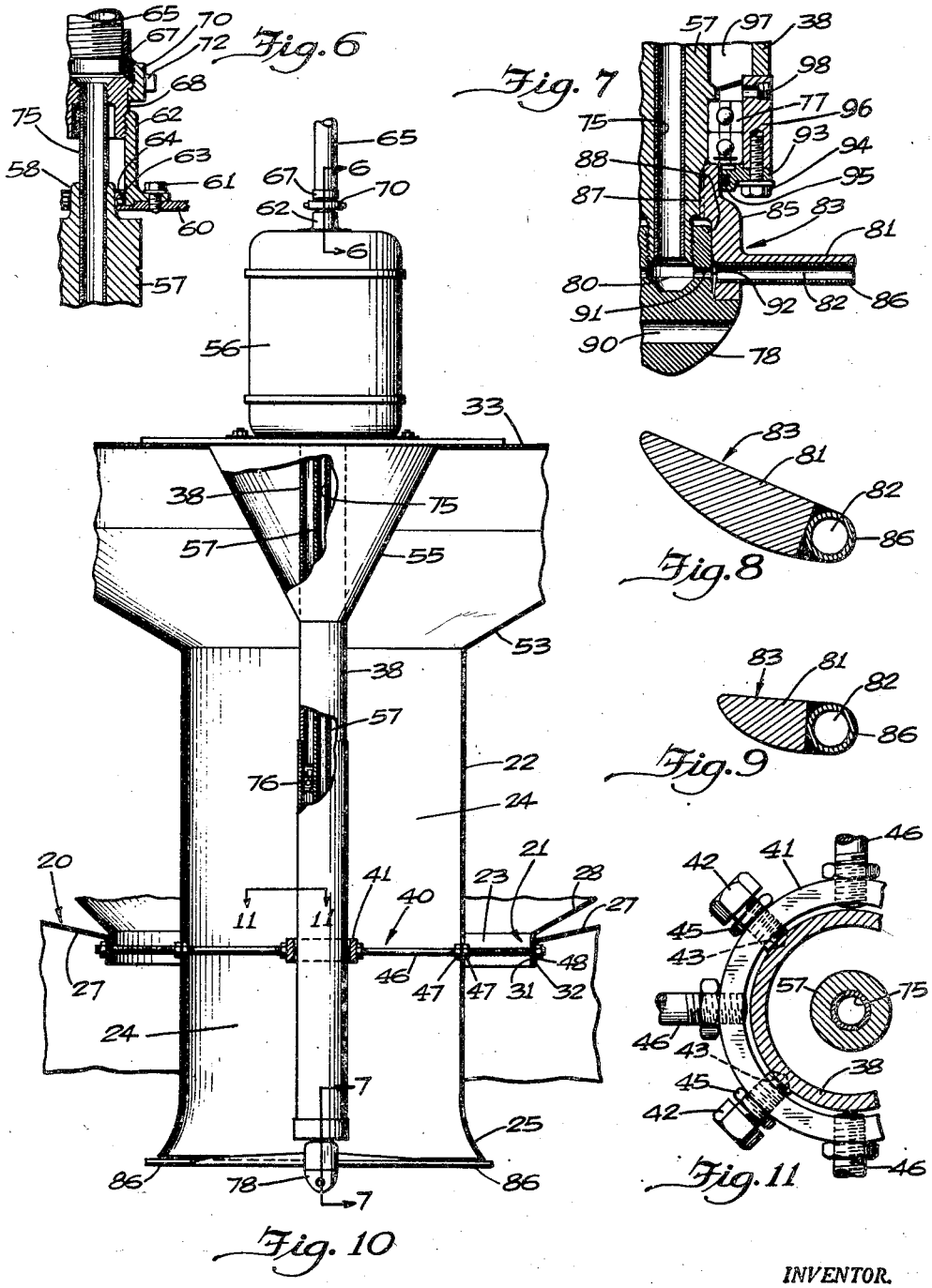

Patented Nov. 28, 1950

2,531,879

UNITED STATES PATENT OFFICE 2,531,879

GASEOUS CURRENT SPRAY DRIER

Joseph M. Hall, Chicago, Ill., assignor to Drying & Concentrating Company, a corporation of Delaware Application April 16, 1945, Serial No. 588,467

5 Claims. (Cl. 159—4)

1

This application is a continuation-in-part of my application, Serial No. 490,739, filed June 14, 1943, which application has matured into Patent No. 2,469,553.

My invention relates to dehydrators with special reference to apparatus for concentrating or dehydrating liquid materials by the employment of a gaseous drying medium such as air or superheated steam. The invention is directed to problems relating to the circulation of the gaseous drying medium and the liquid material for effective evaporation.

In a dehydrator of the type described in my Patent No. 2,217,547, a suitable dehydration chamber has two upper concentric walls forming an outlet port surrounded by an annular inlet port. The gaseous drying medium is introduced into the annular inlet port in a rotary manner by means of a suitable inlet snail so that the gaseous medium circulates in the form of a spiral and is eventually drawn out of the outlet port through an outlet snail. The liquid material to be dehydrated is introduced through a rotary means concentric to the two ports, which rotary means serves the two functions of, first, spraying the liquid material into the circulating drying medium, and, second, propelling the drying medium to promote circulation.

In the operation of such a dehydrating apparatus the following problems are encountered. The problem of achieving uniform rotary flow of the drying medium through the annular intake port with a sufficient rate of axial progress to form an effective vortex or spiral stream; the problem of conveying the liquid material a substantial distance from the exterior of the dehydrating chamber to the rotary means within the dehydrating chamber without causing undue separation of the liquid material ingredients by centrifugal force; the problem of causing the liquid material to flow through the rotating discharge means without such centrifugal separation; the problem of avoiding dynamic unbalance of the rotary means by the accumulation of the material thereon; the problem of constructing a liquid-conveying and spraying arrangement for convenient and rapid overhauling and cleaning; and problems involving the tendency for finely powdered desiccated material to accumulate in the outlet snail.

The principal object of the present invention is to meet these problems successfully in the construction of a dehydrator of this type.

In general, this object is attained by a structure at the top of the dehydrator chamber that

2 may be termed a flow-control combination, which combination controls both the character of flow as well as the path of flow of both the gaseous drying medium and the liquid material under process. The flow control of the liquid material is attained by extending a stationary duct through a hollow spray-actuating shaft all the way to a sprayer head carried by the shaft and is attained further by constructing the sprayer itself to favor simple radial flow of the liquid material with minimum rotary flow. Control of the gaseous drying medium by this combination resides largely in the configurations of the two snails, the inlet snail being shaped to promote uniform incoming flow and the outlet snail being shaped to utilize gravity as well as a certain sweeping effect to prevent accumulation of desiccated material in the outlet snail.

A further object of the invention is to provide a novel construction and fabricating procedure for a combined fan and centrifugal sprayer.

The above objects and further objects and advantages will be apparent in my detailed description to follow taken with the accompanying drawings.

In the drawings, which are to be regarded as merely illustrative;

Figure 1 is a view partly in section and partly in side elevation of my flow-control combination installed on the upper side of a dehydrating chamber, Figure 2 is an elevation of the same device with parts of the chamber wall broken away to reveal the inner structure, Figure 3 is a plan view of the two snails in Figures 1 and 2, Figure 4 is a fragmentary plan view on an enlarged scale of a rotary member constituting the principal part of the sprayer for the liquid material, Figure 5 is a section taken as indicated by the line 5—5 of Figure 4, Figure 6 is a fragmentary sectional view on an enlarged scale at the upper end of the hollow sprayer shaft, the view being taken as indicated by the line 6—6 of Figure 10, Figure 7 is a similar sectional view at the lower end of the hollow shaft taken as indicated by the line 7—7 of Figure 10, Figures 8 and 9 are sections taken as indicated, respectively, by the lines 8—8 and 9—9 of Figure 4, Figure 10 is a fragmentary portion of Figure 1 on an enlarged scale with some parts broken away to reveal inner structure, and Figure 11 is a greatly enlarged fragmentary section taken as indicated by the line 11—11 of Figure 10.

Figures 1 and 2 show the upper portion of a dehydrator chamber, generally designated 20. The particular chamber configuration indicated in the drawings is the tapered configuration disclosed in the above-mentioned patent but it will be readily appreciated that the dehydrator chamber may be of any configuration. At the upper end of the chamber 20 are two continuous walls, namely an outer wall, generally designated 21, and an inner cylindrical wall 22 which define an outlet port or passage 23 surrounded by an annular inlet port or passage 24. The inner cylindrical wall 22 is flared at its lower end, as indicated at 25.

Immediately adjacent the top wall 27 of the dehydrator chamber is an inlet snail 28 that receives the gaseous drying medium from an inlet duct 30 and delivers the drying medium to the inlet port 24 in a rotary manner. As best shown in Figure 10, the previously mentioned outer wall 21 around the inlet port 24 may be in the form of a cylindrical flange 31 at the bottom of the inlet snail 28 reinforced by a similar cylindrical flange 32 on the top wall 27 of the dehydrator chamber. Immediately above the inlet snail 28 is an outlet snail 33 that receives the drying medium from the outlet port 23 and delivers the drying medium to an outlet duct 35. The two snails may be provided with suitable panels or doors, such as indicated at 36 in Figure 2, for access to the interior structure when desired.

The rotary member or sprayer, generally designated 37, that has the additional function of a fan is mounted at the lower end of a tubular housing 38 that extends into the dehydrator chamber 20 along the axis of the outlet port 23. This tubular housing 38, the inner cylindrical wall 22 and the outer wall 21 may be interconnected and braced advantageously by a spider, generally designated 40, the construction of which is best shown in Figures 10 and 11. The spider comprises an inner ring 41 that surrounds the tubular housing 38 and carries three equally spaced cap screws 42 in engagement with the tubular housing. Each of the cap screws, as shown in Figure 11, may seat in a suitable recess 43 in the tubular housing 38 and may be releasably held against retraction by a suitable lock nut 45. Threaded into the inner ring 41 are three radial tie rods 46, each of which is provided with a pair of nuts 47 for engaging the inner cylindrical wall 22 and an outer nut 48 for engaging the outer wall 21.

A feature of the new combination is the shaping of the top wall 50 of the inlet snail 28 to the general configuration of a helical spiral whereby the inlet snail crowds the incoming drying medium into the dehydrator chamber 20 with uniform effect around the annular inlet port 24. In other words, the deflecting action of the helical top wall 50 is such that the pressure differential or thrust across the annular area of the inlet port is uniform, and, consequently the incoming flow is uniform. Because of this effect on the part of the top wall 50 and because of the spiral configuration in plan of the inlet snail, the incoming gaseous medium forms a vortex or spiral which is deflected by the flared wall 25 into an outer descending spiral of expanded diameter, this outer spiral being indicated by the line 51 in Figure 1. This outer spiral progresses to the lower end of the dehydrator chamber 20 whereupon the stream of drying medium returns upward as an inner spiral indicated by the line 52 in Figure 1, the inner spiral rotating in the same direction and leading to the outlet port 23.

As the incoming spiral of the drying medium expands in reaction to the flared wall 25, the rotary sprayer 37 discharges the liquid material in finely divided form into the spiral stream. As a result of prompt evaporation, the desiccated product drops out of the gaseous stream except for a residual amount of extremely finely divided material, which, in most dehydrating operations, remains in the stream of gaseous medium after the stream passes into the outlet port 23. Such residual fine powder has heretofore tended to accumulate in the outlet snail 33 to necessitate extensive cleaning of the outlet snail for sanitary reasons. Unless such accumulated material is completely removed from the outlet snail at the end of one dehydrating operation, the accumulated material may drop back into the dehydrator chamber during a subsequent dehydrating operation to vitiate the product therein.

A feature of the present combination is the shaping of the outlet snail 33 to minimize, if not prevent, such accumulation of finely powdered material therein. To this end, the outlet snail 33 has a bottom wall 53 of conical configuration, the bottom wall being sufficiently inclined toward the outlet port 23 to cause any material on the surface of the bottom wall to gravitate toward the outlet port to become entrained by the outflowing stream of the gaseous drying medium. As further means to this end, I prefer to so construct the outlet snail 33 as to cause the drying medium to sweep the bottom wall 53 so effectively as to minimize any tendency of the finely divided material to alight on the bottom wall. Thus, as shown in Figures 1 and 10, I may provide a wall in the form of an inverted cone 55 around the upper end of the tubular housing 38, the inverted cone sufficiently restricting the interior of the outlet snail to cause the outflowing stream of drying medium to effectively sweep the inclined bottom wall 53. The inverted cone 55 has the added function of bracing the tubular housing 38. It will be noted that the apex of the cone 55 is above the lower extremity of the outlet port 23.

The means for introducing the liquid material for dehydration includes a motor 56 on the top of the outlet snail 33 and a hollow shaft 57 that extends through the motor and also extends below the motor through the tubular housing 38 to carry at its lower end the rotary sprayer 37. As shown in Figure 6, the hollow shaft 57 has an upper reduced end 58 that protrudes through the upper wall 60 of the motor. Mounted on the top of the motor by suitable screws 61 is a fixed collar 62 surrounding the protruding shaft end 58, and suitable annular packing 63 is held in place by a flanged metal ring 64 between the shaft end and the fixed collar 62 for a purpose to be explained hereinafter.

A pipe 65 for supplying the liquid material to be hydrated is connected to the fixed collar 62 on the top of the motor by means of a union comprising an upper sleeve 67 threaded onto the pipe end, a lower sleeve 68 threaded into the fixed collar and a connecting bushing 70 that engages a circumferential shoulder on the lower sleeve and is threaded onto the upper sleeve in a well-known manner. For convenience in assembling and disassembling this union, the connecting bushing 70 may be provided with radial lugs 72 in a well-known manner. The upper sleeve 67 of the union is provided with internal lefthand threads to retain a fixed passage means in the form of a stationary tube 75 that extends downward through the hollow shaft 57 to the rotary sprayer 37. It is contemplated that the hollow shaft will be driven in a rotary direction such that any friction between the shaft and the enclosed stationary tube 75 will tend to tighten the threaded engagement of the stationary tube in the lower sleeve 68 of the union.

The hollow shaft 57 is journalled in and supported by suitable bearings including a bearing 76 (Fig. 10) at an intermediate level in the tubular housing 38 and a bearing 77 (Fig. 7) at the lower end of the tubular housing, the hollow shaft being thus braced and supported by the tubular housing. The rotary sprayer 37 at the lower end of the hollow shaft 57 has a central spray head 78 with a liquid distribution chamber 80 therein and has a plurality of arms 81 that are shaped as fan blades and provide radial spray passages 82 from the distribution chamber. Such a rotary sprayer 37 may be made in two parts, one part constituting the spray head 78, best shown in Figure 7, and the other part constituting the fan member, generally designated 83 and best shown in Figures 4 and 5.

The fan member 83 may comprise a suitable casting formed with a hub portion 85 and radial arms. In my preferred construction, the radial spray passages 82 are provided by welding suitable tubes 86 to the arms of the fan casting in such manner as indicated in Figures 8 and 9 that the tubes form the leading edges of the fan-blade shaped arms 81. It will be noted that in cross section the sprayer arms are of streamlined configuration with the tubes 86 forming blunt rounded leading edges and the cast portions of the blades forming tapering trailing edges. As indicated in Figures 4 and 5, the hub portion 85 of the fan member 83 is formed with internal splines 87 for non-rotative engagement with the lower end of the hollow shaft 57.

The spray head 78 has a cylindrical wall 88 that is threaded onto the lower end of the hollow shaft whereby the spray head serves in effect as a nut for retaining the fan member 83. As indicated in Figure 7, the spray head 78 may be provided with a suitable diametrical bore 90 to receive a rod or other implement for use in assembling or disassembling the sprayer.

As may be understood by referring to Figure 7, the cylindrical wall 88 of the spray head telescopes into the hub portion of the fan casting and is provided with radial bores 91 to serve as portions of the previously-mentioned radial spray passages 82. The provision of a shallow annular space 92 in a circumferential region at the outer ends of the radial bores 91 makes it unnecessary to register the bores precisely with the tubes 86.

Certain features in the internal configuration of the rotary sprayer 37 may be emphasized. One of these features is that the liquid distribution chamber 80 has smooth outwardly converging walls leading to the radial spray passages 82, the arrangement being such as to favor smooth radial flow of the liquid with minimum liquid rotation within the distribution chamber. The importance of this feature is in the fact that any substantial rotation of the liquid on the relatively small radius of the distribution chamber 80 would in many instances tend undesirably to separate the heavier and lighter constituents of the liquid by centrifugal action.

A second feature is the location of the lower end of the stationary tube 75 with respect to the distribution chamber 80. As indicated in Figure 7, the cylindrical clearance space between the stationary tube 75 and the surrounding hollow shaft 57 necessary to permit relative rotation terminates at its lower end at a location where it is swept by the liquid passing radially through the distribution chamber 80 into the radial spray passages 82. The radial flow of the liquid is highly accentuated by centrifugal force acting outwardly through the radial passages. The resultant high velocity flow of the liquid material tends to create by a Venturi effect relatively low pressure at the lower end of the cylindrical clearance around the stationary tube and thereby reduce the tendency of the liquid to creep up the cylindrical clearance space. It will be noted that the previously-mentioned annular packing 63 at the upper end of the tubular shaft seals off from the atmosphere the cylindrical clearance space around the stationary tube, such a seal being especially desirable to minimize liquid flow up the cylindrical clearance space when the pressure in the distribution chamber 80 is substantially above atmospheric pressure.

It is further desirable to prevent the liquid material from flowing upward past the splines 87 to the exterior of the hollow shaft 57. For this purpose, a packing ring 93 containing suitable packing material 95 may be mounted on the lower end of the tubular housing 38. The packing ring 93 is removably mounted by screws 94 on the lower end of a heavy band 96 that is integral with the tubular housing. It will be noted in Figure 7 that the liquid material cannot flow upward through the annular space 97 between the shaft and the tubular housing because the lower bearing 77 is of sealed construction, it being contemplated that the bearing will normally be filled with lubricant introduced by a suitable fitting (not shown) threaded into the lubricant bore 98.

The operation of the invention will be readily understood from the foregoing description. It will be noted that the rotary sprayer 37 is relatively close to the flared entrance to the outlet port 23 with the radial tubes 86 extending outwardly beyond the flared wall. By virtue of this arrangement, there is no tendency for air from the inlet port 24 to shunt around the flared wall into the outlet port instead of flowing in the previously-described spiral path. It will also be noted that the rotary sprayer 37 has no outer rim portion, the arms 81 of the sprayer being interconnected only at the hub portion of the sprayer. The elimination of any rim structure and the shaping of the blades to relatively small cross-sectional dimensions minimizes the possibility of desiccated material collecting on the rotary sprayer to upset the dynamic balance of the sprayer. Dynamic unbalance caused by accumulated material on rim structure has been a source of trouble in this type of dehydration apparatus, the effect being destructive vibration.

It is apparent that various changes and substitutions may be made under my basic concept and I specifically reserve the right to all such departures from my description that properly fall within the spirit of my appended claims.

I claim:

1. In a dehydrating apparatus for producing a powdered product from liquid material by spraying the liquid material into a circulating gaseous drying medium, a dehydrating chamber having inlet and outlet ports for the gaseous drying medium, means to cause the drying medium to circulate through said chamber, and a passage means in the form of an outlet snail to receive the circulated drying medium from said chamber, said snail extending around said outlet port and having a bottom conical wall sloping inward toward said outlet port and a top conical wall also sloping inward to increase the sweeping action of the stream of drying material on said sloping bottom wall, the apex of said top conical wall being above the lower extremity of said outlet port.

2. In a dehydrating apparatus for processing a liquid material by spraying the liquid material into a circulating gaseous drying medium, a dehydrating chamber having an annular inlet port defined by two continuous walls, said chamber also having an outlet port, and passage means in the form of an inlet snail to introduce the gaseous drying medium into said inlet port with rotary motion for circulation through the chamber, said snail extending around said inlet port and having a wall opposite the inlet port that spirals helically toward the inlet port to cause substantially uniform flow of the drying medium therethrough.

3. In a dehydrating apparatus for processing a liquid material by spraying the liquid material into a chamber through which a gaseous drying medium is circulated, the combination of a hollow driven shaft extending vertically into said chamber, a rotary sprayer in said chamber on the lower end of said shaft, said sprayer having a central distribution chamber with spray passages extending outward therefrom, and a stationary tube within said hollow shaft to convey the liquid material from the exterior of the chamber to said rotary sprayer without subjecting the liquid to centrifugal force in transit.

4. In a dehydrating apparatus for processing a liquid material by spraying the liquid material into a chamber through which a gaseous drying medium is circulated, the combination of a first stationary wall of circular cross-sectional configuration forming an outlet port in said chamber, a second stationary wall of circular cross-sectional configuration surrounding said first wall to form therewith an annular inlet port, a passage means in the form of an inlet snail to introduce the gaseous drying medium into said inlet port with rotary motion for circulation through the chamber, said snail extending around said inlet port and having a wall opposite the inlet port that spirals helically toward the inlet port to cause substantially uniform flow of the drying medium therethrough.

5. In a dehydrating apparatus for processing a liquid material by spraying the liquid material into a chamber through which a gaseous drying medium is circulated, the combination of a hollow driven shaft extending vertically into said chamber, a rotary sprayer in said chamber on said shaft, a stationary tube mounted within said shaft to carry the liquid material to said distribution chamber, said stationary tube defining with said shaft an annular running clearance space, and means cutting off communication between said annular clearance space and the exterior of the chamber to prevent atmospheric pressure from influencing fluid flow between said sprayer and said clearance space.

JOSEPH M. HALL.

REFERENCES CITED

The following references are of record in the file of this patent:

UNITED STATES PATENTS

| Number | Name | Date |
|---|---|---|
| 32,222 | Gwynne | Apr. 30, 1861 |
| 1,288,126 | Muller | Dec. 17, 1918 |
| 1,939,364 | Peebles et al. | Dec. 12, 1933 |
| 1,964,858 | Peebles | July 3, 1934 |
| 2,033,470 | Keenan | Mar. 10, 1936 |
| 2,047,699 | MacLachlan | July 14, 1936 |
| 2,074,818 | Watson | May 23, 1937 |
| 2,217,547 | Hall | Oct. 8, 1940 |
| 2,367,770 | Hall | Jan. 23, 1944 |
| 2,469,553 | Hall | May 10, 1949 |

FOREIGN PATENTS

| Number | Country | Date |
|---|---|---|
| 845,701 | France | May 22, 1939 |